United States Patent

Momiyama

[11] 4,364,643
[45] Dec. 21, 1982

[54] LARGE APERTURE RATIO PHOTOGRAPHIC LENS

[75] Inventor: Kikuo Momiyama, Yokohama, Japan

[73] Assignee: Canon Kabushiki Kaisha, Tokyo, Japan

[21] Appl. No.: 153,861

[22] Filed: May 28, 1980

[30] Foreign Application Priority Data

May 30, 1979 [JP] Japan ............................. 54-67047

[51] Int. Cl.³ ........................ G02B 9/62; G02B 11/32
[52] U.S. Cl. ................................................. 350/464
[58] Field of Search ......................................... 350/464

[56] References Cited

U.S. PATENT DOCUMENTS

3,552,829  1/1971  Marquardt ........................ 350/464
3,738,736  6/1973  Shimizu ........................... 350/464

Primary Examiner—John K. Corbin
Assistant Examiner—Rebecca D. Gass
Attorney, Agent, or Firm—Toren, McGeady & Stanger

[57] ABSTRACT

Disclosed is a photographic lens with improved correction for off-axis halo and image plane distortion, and composed of seven lenses in six components. The first component consists of a positive meniscus lens having a convex surface toward the object, the second component a positive meniscus lens having a convex surface toward the object, the third component a negative meniscus lens having a convex surface toward the object, the fourth component a negative meniscus lens consisting of a negative and a positive lens cemented to each other and having a convex surface toward the image as a whole, the fifth component a positive meniscus lens having a convex surface toward the image and the sixth component a bi-convex lens; with the conditions:

(1) $1.75 < (N1 + N2 + N5 + N6 + N7)/5$
(2) $(\nu1 + \nu2 + \nu5 + \nu6 + \nu7)/5 > 45$.
(3) $1.85 < n6$
(4) $\nu4 < 26$.
(5) $n3 < 1.67$ $$0.34f < \frac{R6 + |R7|}{2} < 0.37f, \ R7 < 0 \quad (6)$$

(7) $0.30f < D6 < 0.35f$
(8) $0.4/f < |\phi4 + \phi5| < 0.6/f, \ \phi4 + \phi5 < 0$
(9) $0.68f < |R11| < 0.73f, \ R11 < 0$ wherein:
  f is the focal length of the whole lens system
  Ri is the radius of curvature of the i-th surface
  Di is the distance between the i-th and (i+1)th surface
  Ni is the refractive index of the i-th lens
  $\nu$i is the Abbe number of the i-th lens
  $\phi$i is the refracting ower of the i-th surface.

4 Claims, 15 Drawing Figures

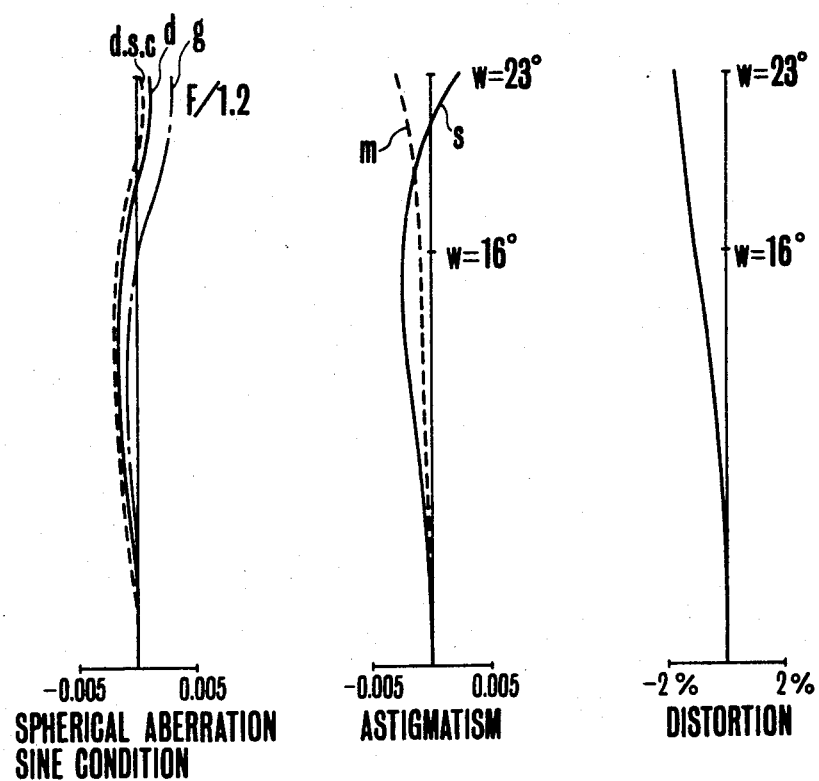
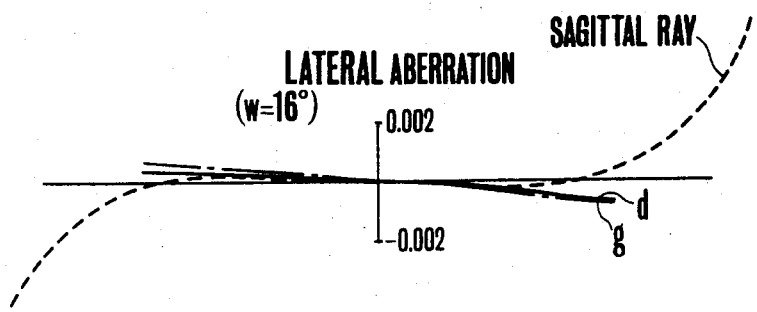

LARGE APERTURE RATIO PHOTOGRAPHIC LENS

BACKGROUND OF THE INVENTION

The present invention relates to improvements in large aperture-ratio standard lens systems, particularly lens systems of the deformed Gauss type for use with single lens reflux cameras, and composed of seven lenses in six components.

Generally, a Gauss type or deformed Gauss type lens is used as the standard large aperture-ratio lens in a single lens reflex camera because such lenses permit a large aperture-ratio with a relatively long back focus.

U.S. Pat. Nos. 4,099,843 and 4,110,007, U.S. patent application Ser. No. 891,024 now U.S. Pat. No. 4,247,171, and Japanese patent applications Laid-Open Nos. Sho 53-69031 and Sho 53-117420, disclose various attempts at correcting aberrations in such lenses.

However, even in a Gauss type lens consisting of seven lenses in six components and having a superior picture quality, aperture-ratios as large as F=1:1.2 result in increases in various aberrations, especially off-axial halo and curvature of field. This lowers the contrast of the picture or the resolving power of the lens.

An object of the present invention is to provide a standard angle large aperture lens for single lens reflex cameras.

Another object of the present invention is to correct various aberrations, particularly off-axial halo and curvature of field.

According to an aspect of the invention, the lens is composed of seven lenses in six components. The first component consists of a positive meniscus lens having a convex surface toward the object, the second component a positive meniscus lens having a convex surface toward the object, the third component a negative meniscus lens having a convex surface toward the object, the fourth component a negative meniscus lens consisting of a negative and a positive lens cemented to each other and having a convex surface toward the image as a whole, the fifth component a positive meniscus lens having a convex surface toward the image and the sixth component a bi-convex lens, with the following conditions:

(1) $1.75 < (N1+N2+N5+N6+N7)/5$
(2) $(\nu1+\nu2+\nu5+\nu6+\nu7)/5 > 45$.
(3) $1.85 < n6$
(4) $\nu4 < 26$.
(5) $n3 < 1.67$ $$0.34f < \frac{R6 + |R7|}{2} < 0.37f, \; R7 < 0 \quad (6)$$

(7) $0.30f < D6 < 0.35f$
(8) $0.4/f < |\phi4+\phi5| < 0.6/f, \; \phi4+\phi5 < 0$
(9) $0.68f < |R11| < 0.73f, \; R11 < 0$.

BRIEF DESCRIPTION OF THE DRAWINGS

FIGS. 5A to 5D each show an aberration of the second embodiment.

DESCRIPTION OF THE PREFERRED EMBODIMENTS

Figure 1:
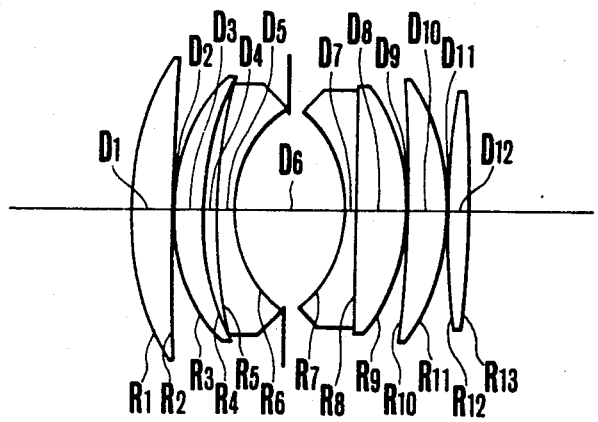
FIG. 1 shows a section of a first embodiment of the lens in accordance with the present embodiment.
Figure 2:
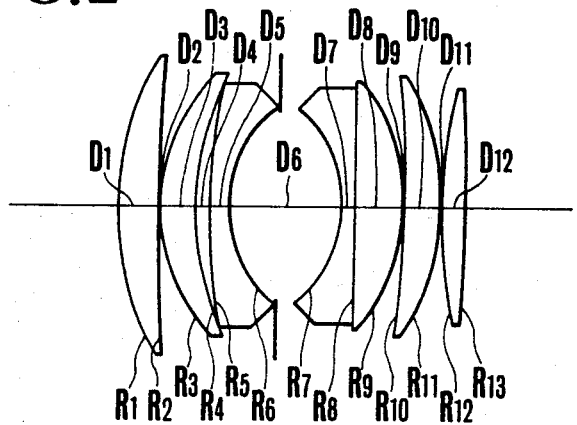
FIG. 2 shows a section of a second embodiment.
Figure 3:
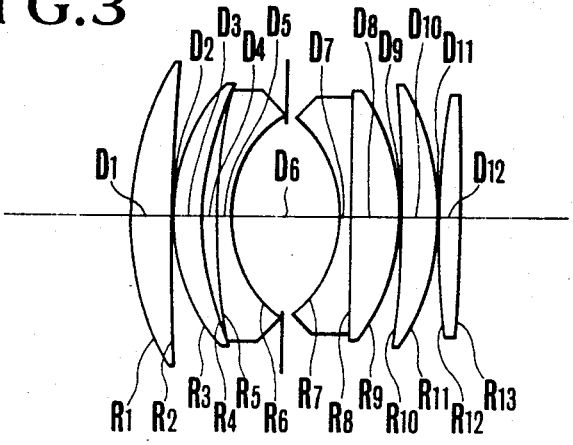
FIG. 3 shows a section of a third embodiment.
Figures 4A, 4B, 4C:
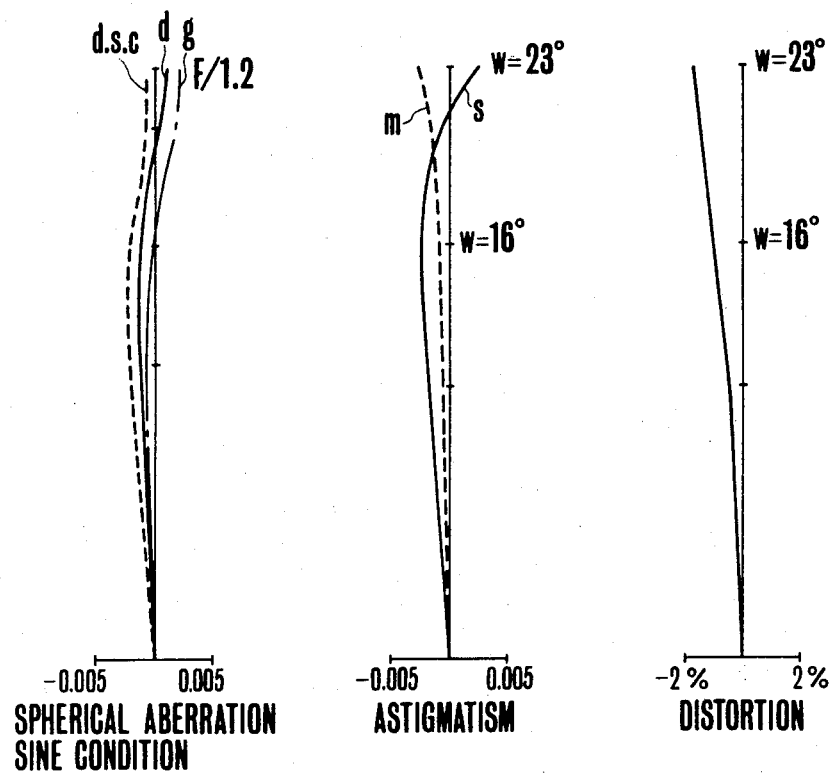
FIGS. 4A to 4D each show an aberration of the first embodiment.
Figure 4D:
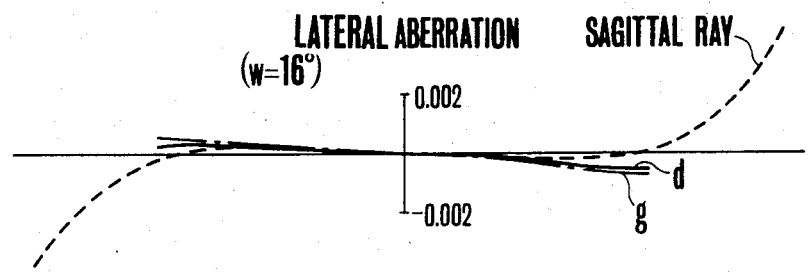
Figures 6A, 6B, 6C:
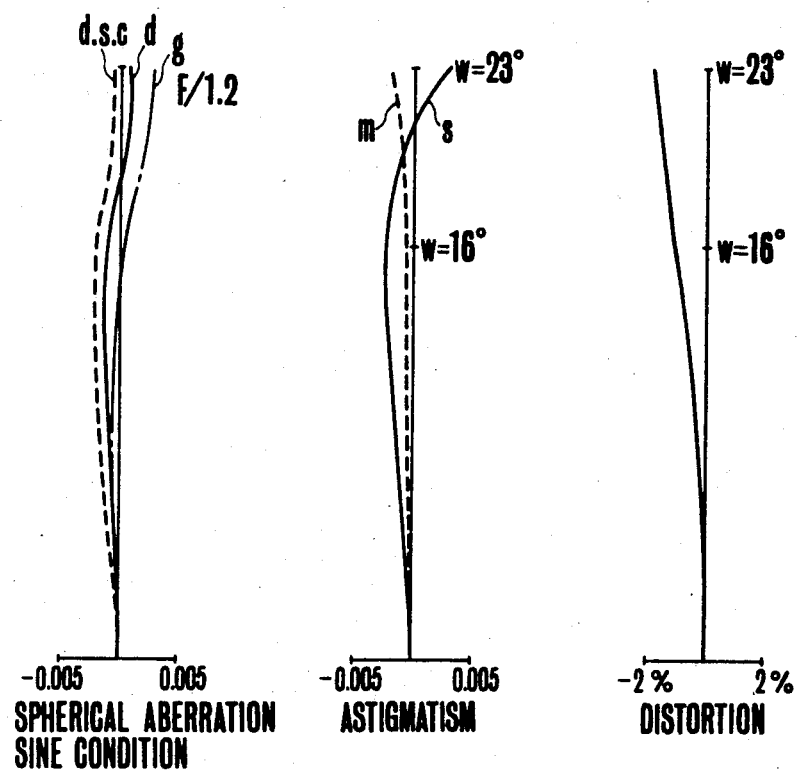
FIGS. 6A to 6D each show an aberration of the third embodiment.
Figure 6D:
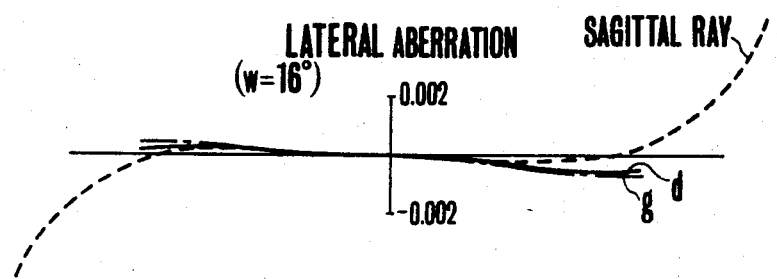

FIGS. 1, 2 and 3 show embodiments of respective lenses whose lens data normalized for a focal length=1 are as follows: Each embodiment consists of a positive meniscus lens (r1, r2) having a convex surface toward the object, a positive meniscus lens (r3, r4) having a convex surface toward the object, an air gap, a negative meniscus lens (r5, r6) having a convex surface toward the object, a diaphragm, a negative meniscus lens (r7, r9) constituted with a negative and a positive lens cemented with each other and having a convex surface toward the image, a positive meniscus lens (r10, r11) having a convex surface toward the image and a bi-convex lens (r12, r13) in sequence from the object. The spherical aberrations and the sine conditions of respective lenses with reference to the object at the infinite distance are shown in FIGS. 4A, 5A and 6A. The distortions are given in FIGS. 4C, 5C and 6C. The curvatures of field are shown in FIGS. 4B, 5B and 6B for the astigmatisms (meridional image surface: m, sagittal image surface: S). The off-axial halo are shown in FIGS. 4D, 5D and 6D for the lateral aberrations.

Generally, in order to keep the field curvature small, it is necessary that the Petzval's sum should be small. However, in order to keep the Petzval's sum small, it is necessary that the refractive index of each lens should be large, whereby the correction of the aberrations such as the off-axial halo is difficult for large aperture ratio lens such as of F/1.2. In order to correct the field curvature and the off-axial halo simultaneously it is effective that the positive lenses should be constituted with a glass having as high refractive index as possible. However, the glass to be made use of has a limit, whereby there exists a tendency that with reference to the glass whose refractive index is larger than 1.75 the larger the refractive index is the larger the dispersion is, so that the correction of the chromatic aberration becomes difficult when a glass with remarkably large refractive index. The relations (1), (2), (3), (4) and (5) are the conditions for the effective glass under the afore mentioned restriction of the glass distribution. Out of them, the relations (1) and (2) are the basic conditions, more or less of the character of the sufficient condition for making the correction of the field curvature, the off-axial halo and the chromatic aberration easy, whereby the refractive index of the all positive lenses is kept large and the dispersion is kept small. The relation (3) is the condition for constituting the most effective 6th lens with the glass having a larger refractive index than 1.85 and effective for the aberration correction in order to correct the spherical aberration and the off-axial halo. In case the above relations are not fulfilled, the compensation of the field curvature, the off-axial halo and the chromatic aberration becomes difficult even if the conditions to be mentioned below are fulfilled. The relation (4) is the condition for correcting the under-correction of the chromatic aberration when the glass for constituting the positive lenses are selected under the above-mentioned conditions, whereby if this condition is not fulfilled the correction of the chromatic aberration becomes difficult. The relation (5) is the condition for constituting the third lens with the glass having a comparatively small refractive index in order to further improve the Petzval's sum, whereby if this condition is not fulfilled the compensation of the Petzval's sum cannot be safficiently corrected. In accordance with the present invention beside the above-mentioned conditions for the glass to be used the following conditions are further given for the basic lens constitution for obtaining a good aberration correction. The conditions (6) and (7) are for obtaining the best correction of the field curvature and the off-axial halo under the conditions (1), (2), (3), (4) and (5), whereby beyond the upper limit of the condition (6) the astigmatism is under-corrected and the field curvatuve is difficult to be corrected, while beyond the lower limit the off-axial halo is difficult to be corrected. The condition (7) is for obtaining the proper correction of the off-axial halo under the condition (6), whereby beond the lower limit the correction of the off-axial halo is difficult, while beyond the upper limit the astigmatism is under-corrected and the light amount along the circumference is decreased, which is disadvantageous.

The condition (8) is for the refractive index of the divergent air lens sandwiched between the fourth and the fifth surface in order to correct the under-correction of the astigmatism under the conditions (6) and (7) and to obtain a sufficiently long back focus of the whole lens system by means of the divergent effect of the air lens. Beyond the lower limit of this condition the astigmatism is under-corrected and it is difficult to obtain a long back focus, while beyond the upper limit much undercorrection of the coma takes place, which is disadvantageous. The condition (9) relates to the shape of the 6th lens consisting of a glass with large refractive index in order to properly correct the spherical aberration and the coma, whereby beyond the upper limit of this condition the coma is under-estimated, while the lower limit the under-correction of the spherical aberration is increased.

When the refractive index and dispersion of the glass according to the conditions (3), (4) and (5) are limited by the lens data, the results are:
$1.85 < n6 < 1.9$, $25 < \nu4 < 26$, $1.6 < n3 < 1.67$ As explained above, in accordance with the present invention a large aperture standard lens for the single lens reflex camera, whose field curvature, the off-axial halo and other aberrations are, as is shown in the drawings, properly corrected, can be offered.

Embodiment 1:
Focal length $f = 1$   F.No. 1:1.2   Image angle $2\omega = 46°$

| | | | |
|---|---|---|---|
| $R_1 = 0.84846$ | $D_1 = 0.11815$ | $N_1 = 1.7725$ | $\nu_1 = 49.6$ |
| $R_2 = 6.16873$ | $D_2 = 0.00291$ | | |
| $R_3 = 0.56128$ | $D_3 = 0.08827$ | $N_2 = 1.7725$ | $\nu_2 = 49.6$ |
| $R_4 = 0.88343$ | $D_4 = 0.03832$ | | |
| $R_5 = 1.70294$ | $D_5 = 0.04842$ | $N_3 = 1.62588$ | $\nu_3 = 35.7$ |
| $R_6 = 0.35417$ | $D_6 = 0.32347$ | | |
| $R_7 = -0.36350$ | $D_7 = 0.03293$ | $N_4 = 1.80518$ | $\nu_4 = 25.4$ |
| $R_8 = \infty$ | $D_8 = 0.14446$ | $N_5 = 1.7725$ | $\nu_5 = 49.6$ |
| $R_9 = -0.59484$ | $D_9 = 0.00291$ | | |
| $R_{10} = -3.15150$ | $D_{10} = 0.10072$ | $N_6 = 1.883$ | $\nu_6 = 40.8$ |
| $R_{11} = -0.71025$ | $D_{11} = 0.00291$ | | |
| $R_{12} = 2.09424$ | $D_{12} = 0.06198$ | $N_7 = 1.7725$ | $\nu_7 = 49.6$ |
| $R_{13} = -5.38540$ | | | |

Hereby, Ri: radius of curvature, Di: thickness of the i-th lens or air gap, Ni: refractive index of the i-th lens, $\nu$i: the Abbe's number of the i-th lens.

3rd Aberration coefficient

| | I | II | III | P | V |
|---|---|---|---|---|---|
| 1 | 0.4025 | 0.1209 | 0.0363 | 0.5136 | 0.1652 |
| 2 | 0.1938 | −0.4147 | 0.8870 | −0.0706 | −1.7463 |
| 3 | −0.0936 | −0.0696 | −0.0517 | 0.7764 | 0.5390 |
| 4 | 0.0970 | −0.3234 | 1.0780 | −0.4933 | −1.9489 |
| 5 | −0.4587 | 0.8170 | −1.4552 | 0.2260 | 2.1892 |
| 6 | −0.5958 | −0.2941 | −0.1452 | −1.0869 | −0.6083 |
| 7 | −1.7316 | 0.6445 | −0.2399 | −1.2270 | 0.5460 |
| 8 | −0.0079 | −0.0157 | −0.0311 | 0.0000 | −0.0615 |
| 9 | 0.2184 | −0.1295 | 0.0768 | 0.7326 | −0.4799 |
| 10 | 0.0000 | −0.0008 | 0.0081 | −0.1487 | 1.2940 |
| 11 | 1.4564 | −0.1036 | 0.0073 | 0.6602 | −0.0475 |
| 12 | −0.0189 | 0.0795 | −0.3331 | 0.2081 | 0.5238 |
| 13 | 0.6444 | −0.2834 | 0.1246 | 0.0809 | −0.0904 |
| Σ | 0.1061 | 0.0269 | 0.0379 | 0.1713 | 0.2743 |

Hereby:
I: Spherical aberration coefficient
II: Astigmatic coefficient
III: Coma coefficient
P: Petzval's sum
V: Distortion coefficient Embodiment 2:
Focal length $f = 1$   F.No. 1:1.2   Image angle $2\omega = 46°$

| | | | |
|---|---|---|---|
| $R_1 = 0.87785$ | $D_1 = 0.11823$ | $N_1 = 1.7725$ | $\nu_1 = 49.6$ |
| $R_2 = 6.16969$ | $D_2 = 0.00291$ | | |
| $R_3 = 0.55216$ | $D_3 = 0.10121$ | $N_2 = 1.713$ | $\nu_2 = 53.9$ |
| $R_4 = 0.89993$ | $D_4 = 0.03729$ | | |
| $R_5 = 1.69652$ | $D_5 = 0.04458$ | $N_3 = 1.62004$ | $\nu_3 = 36.3$ |
| $R_6 = 0.34887$ | $D_6 = 0.34306$ | | |
| $R_7 = -0.34887$ | $D_7 = 0.02907$ | $N_4 = 1.78472$ | $\nu_4 = 25.7$ |
| $R_8 = 138.385$ | $D_8 = 0.14027$ | $N_5 = 1.7725$ | $\nu_5 = 49.6$ |
| $R_9 = -0.55565$ | $D_9 = 0.00291$ | | |
| $R_{10} = -2.74235$ | $D_{10} = 0.10079$ | $N_6 = 1.883$ | $\nu_6 = 40.8$ |
| $R_{11} = -0.68806$ | $D_{11} = 0.00291$ | | |
| $R_{12} = 1.80447$ | $D_{12} = 0.06202$ | $N_7 = 1.713$ | $\nu_7 = 53.9$ |
| $R_{13} = -7.56398$ | | | |

3rd Aberration coefficient

| | I | II | III | P | V |
|---|---|---|---|---|---|
| 1 | 0.3634 | 0.1040 | 0.0297 | 0.4964 | 0.1506 |
| 2 | 0.1685 | −0.3816 | 0.8638 | −0.0706 | −1.7954 |
| 3 | −0.0737 | −0.0455 | −0.0280 | 0.7538 | 0.4477 |
| 4 | 0.0895 | −0.3056 | 1.0427 | −0.4625 | −1.9795 |
| 5 | −0.4138 | 0.7753 | −1.4525 | 0.2255 | 2.2985 |
| 6 | −0.6955 | −0.3044 | −0.1332 | −1.0970 | −0.5385 |
| 7 | −1.7813 | 0.6135 | −0.2112 | −1.2603 | 0.5068 |
| 8 | −0.0036 | −0.0069 | −0.0130 | −0.0000 | −0.0246 |
| 9 | 0.2922 | −0.1425 | 0.0695 | 0.7843 | −0.4164 |
| 10 | −0.0002 | 0.0014 | −0.0099 | −0.1709 | 1.2294 |
| 11 | 1.6043 | −0.0695 | 0.0030 | 0.6815 | −0.0296 |
| 12 | 0.0125 | 0.0645 | −0.3315 | 0.2306 | 0.5183 |
| 13 | 0.5772 | −0.2767 | 0.1326 | 0.0550 | −0.0899 |
| Σ | 0.1145 | 0.0259 | −0.0381 | 0.1659 | 0.2773 |

Embodiment 3:
Focal length $f = 1$   F.No. 1:1.2   Image angle $2\omega = 46°$

| | | | |
|---|---|---|---|
| $R_1 = 0.82369$ | $D_1 = 0.11817$ | $N_1 = 1.788$ | $\nu_1 = 47.4$ |
| $R_2 = 5.96790$ | $D_2 = 0.00291$ | | |
| $R_3 = 0.54669$ | $D_3 = 0.08638$ | $N_2 = 1.788$ | $\nu_2 = 47.4$ |
| $R_4 = 0.85236$ | $D_4 = 0.03547$ | | |
| $R_5 = 1.68536$ | $D_5 = 0.04456$ | $N_3 = 1.6668$ | $\nu_3 = 33.$ |
| $R_6 = 0.35451$ | $D_6 = 0.31189$ | | |
| $R_7 = -0.36419$ | $D_7 = 0.03293$ | $N_4 = 1.80518$ | $\nu_4 = 25.4$ |
| $R_8 = -31.3634$ | $D_8 = 0.14015$ | $N_5 = 1.7725$ | $\nu_5 = 49.6$ |
| $R_9 = -0.58732$ | $D_9 = 0.00291$ | | |
| $R_{10} = -3.94968$ | $D_{10} = 0.10073$ | $N_6 = 1.863$ | $\nu_6 = 41.5$ |
| $R_{11} = -0.72005$ | $D_{11} = 0.00291$ | | |

-continued

Embodiment 3:
Focal length f = 1    F.No. 1:1.2    Image angle 2ω = 46°

| | | | |
|---|---|---|---|
| $R_{12}$ = 2.37377 | $D_{12}$ = 0.06199 | $N_7$ = 1.7725 | $\nu_7$ = 49.6 |
| $R_{13}$ = −4.76363 | | | |

3rd Aberration coefficient

| | I | II | III | P | V |
|---|---|---|---|---|---|
| 1 | 0.4410 | 0.1266 | 0.0363 | 0.5350 | 0.1640 |
| 2 | 0.2284 | −0.4672 | 0.9556 | −0.0738 | −1.8032 |
| 3 | −0.1084 | −0.0822 | −0.0624 | 0.8061 | 0.5644 |
| 4 | 0.1177 | −0.3694 | 1.1592 | −0.5170 | −2.0149 |
| 5 | −0.5592 | 0.9480 | −1.6070 | 0.2373 | 2.3218 |
| 6 | −0.6029 | −0.2970 | −0.1463 | −1.1284 | −0.6281 |
| 7 | −1.7622 | 0.6936 | −0.2729 | −1.2247 | 0.5894 |
| 8 | −0.0075 | −0.0149 | −0.0294 | 0.0003 | −0.0574 |
| 9 | 0.2396 | −0.1428 | 0.0851 | 0.7420 | −0.4931 |
| 10 | 0.0001 | −0.0013 | 0.0173 | −0.1172 | 1.3077 |
| 11 | 1.4820 | −0.1571 | 0.0166 | 0.6433 | −0.0699 |
| 12 | −0.0298 | 0.1000 | −0.3352 | 0.1836 | 0.5083 |
| 13 | 0.6705 | −0.3064 | 0.1400 | 0.0914 | −0.1058 |
| Σ | 0.1092 | 0.0295 | −0.0431 | 0.1779 | 0.2831 |

What is claimed is:

1. A large aperture ratio photographic lens comprising: six lens components the first component consisting of a positive meniscus lens having a convex plane toward the object, the second component a positive meniscus lens having a convex surface toward the object, the third component a negative meniscus lens having a convex surface toward the object, the fourth component a negative meniscus lens consisting of a negative and a positive lens cemented to each other and having a convex surface toward the image, the fifth component a positive meniscus lens having a convex surface toward the image and the sixth component a bi-convex lens, wherein the conditions:

(1) $1.75 < (N1+N2+N5+N6+N7)/5$
(2) $(\nu1+\nu2+\nu5+\nu6+\nu7)/5 > 45$.
(3) $1.85 < n6$
(4) $\nu4 < 26$.
(5) $n3 < 1.67$ $$0.34f < \frac{R6 + |R7|}{2} < 0.37f, \; R7 < 0 \quad (6)$$

(7) $0.30f < D6 < 0.35f$
(8) $0.4/f < |\phi4+\phi5| < 0.6/f, \; \phi4+\phi5 < 0$
(9) $0.68f < |R11| < 0.73f, \; R11 < 0$ wherein:
f is the focal length of the whole lens system
Ri is the radius of curvature of the i-th surface
Di is the distance between the i-th and (i+1)th surface
Ni is the refractive index of the i-th lens
$\nu$i is the Abbe number of the i-th lens
$\phi$i is the refracting power of the i-th surface.

2. A large aperture ratio photographic lens in accordance with claim 1, wherein:

Focal length f = 1    F.No. 1:1.2    Image angle 2ω = 46°

| | | | |
|---|---|---|---|
| $R_1$ = 0.84846 | $D_1$ = 0.11815 | $N_1$ = 1.7725 | $\nu_1$ = 49.6 |
| $R_2$ = 6.16873 | $D_2$ = 0.00291 | | |
| $R_3$ = 0.56128 | $D_3$ = 0.08827 | $N_2$ = 1.7725 | $\nu_2$ = 49.6 |
| $R_4$ = 0.88343 | $D_4$ = 0.03832 | | |
| $R_5$ = 1.70294 | $D_5$ = 0.04842 | $N_3$ = 1.62588 | $\nu_3$ = 35.7 |
| $R_6$ = 0.35417 | $D_6$ = 0.32347 | | |
| $R_7$ = −0.36350 | $D_7$ = 0.03293 | $N_4$ = 1.80518 | $\nu_4$ = 25.4 |
| $R_8$ = ∞ | $D_8$ = 0.14446 | $N_5$ = 1.7725 | $\nu_5$ = 49.6 |
| $R_9$ = −0.59484 | $D_9$ = 0.00291 | | |
| $R_{10}$ = −3.15150 | $D_{10}$ = 0.10072 | $N_6$ = 1.883 | $\nu_6$ = 40.8 |
| $R_{11}$ = −0.71025 | $D_{11}$ = 0.00291 | | |
| $R_{12}$ = 2.09424 | $D_{12}$ = 0.06198 | $N_7$ = 1.7725 | $\nu_7$ = 49.6 |
| $R_{13}$ = −5.38540 | | | | where,
Ri is the radius of curvatuve of the i-th surface
Di is the thickness of the i-th lens or air gap
Ni is the refractive index of the i-th lens
$\nu$i is the Abbe number of the i-th lens.

3. A large aperture ratio photographic lens in accordance with claim 1, wherein:

Focal length f = 1    F.No. 1:1.2    Image angle 2ω = 46°

| | | | |
|---|---|---|---|
| $R_1$ = 0.87785 | $D_1$ = 0.11823 | $N_1$ = 1.7725 | $\nu_1$ = 49.6 |
| $R_2$ = 6.16969 | $D_2$ = 0.00291 | | |
| $R_3$ = 0.55216 | $D_3$ = 0.10121 | $N_2$ = 1.713 | $\nu_2$ = 53.9 |
| $R_4$ = 0.89993 | $D_4$ = 0.03729 | | |
| $R_5$ = 1.69652 | $D_5$ = 0.04458 | $N_3$ = 1.62004 | $\nu_3$ = 36.3 |
| $R_6$ = 0.34887 | $D_6$ = 0.34306 | | |
| $R_7$ = −0.34887 | $D_7$ = 0.02907 | $N_4$ = 1.78472 | $\nu_4$ = 25.7 |
| $R_8$ = 138.385 | $D_8$ = 0.14027 | $N_5$ = 1.7725 | $\nu_5$ = 49.6 |
| $R_9$ = −0.55565 | $D_9$ = 0.00291 | | |
| $R_{10}$ = −2.74235 | $D_{10}$ = 0.10079 | $N_6$ = 1.883 | $\nu_6$ = 40.8 |
| $R_{11}$ = −0.68806 | $D_{11}$ = 0.00291 | | |
| $R_{12}$ = 1.80447 | $D_{12}$ = 0.06202 | $N_7$ = 1.713 | $\nu_7$ = 53.9 |
| $R_{13}$ = −7.56398 | | | | where,
Ri is the radius of curvature of the i-th surface
Di is the thickness of the i-th lens or air gap
Ni is the refractive index of the i-th lens
$\nu$i is the Abbe number of the i-th lens.

4. A large aperture ratio photographic lens in accordance with claim 1, wherein

Focal length f = 1    F.No. 1:1.2    Image angle 2ω = 46°

| | | | |
|---|---|---|---|
| $R_1$ = 0.82369 | $D_1$ = 0.11817 | $N_1$ = 1.788 | $\nu_1$ = 47.4 |
| $R_2$ = 5.96790 | $D_2$ = 0.00291 | | |
| $R_3$ = 0.54669 | $D_3$ = 0.08638 | $N_2$ = 1.788 | $\nu_2$ = 47.4 |
| $R_4$ = 0.85236 | $D_4$ = 0.03547 | | |
| $R_5$ = 1.68536 | $D_5$ = 0.04456 | $N_3$ = 1.6668 | $\nu_3$ = 33. |
| $R_6$ = 0.35451 | $D_6$ = 0.31189 | | |
| $R_7$ = −0.36419 | $D_7$ = 0.03293 | $N_4$ = 1.80518 | $\nu_4$ = 25.4 |
| $R_8$ = −31.3634 | $D_8$ = 0.14015 | $N_5$ = 1.7725 | $\nu_5$ = 49.6 |
| $R_9$ = −0.58732 | $D_9$ = 0.00291 | | |
| $R_{10}$ = −3.94968 | $D_{10}$ = 0.10073 | $N_6$ = 1.863 | $\nu_6$ = 41.5 |
| $R_{11}$ = −0.72005 | $D_{11}$ = 0.00291 | | |
| $R_{12}$ = 2.37377 | $D_{12}$ = 0.06199 | $N_7$ = 1.7725 | $\nu_7$ = 49.6 |
| $R_{13}$ = −4.76363 | | | | where,
Ri is the radius of curvatuve of the i-th surface
Di is the thickness of the i-th lens or air gap
Ni is the refractive index of the i-th lens
$\nu$i is the Abbe number of the i-th lens.

* * * * *